US006601285B1

(12) United States Patent
Jonker et al.

(10) Patent No.: US 6,601,285 B1
(45) Date of Patent: Aug. 5, 2003

(54) IMPACT TOOL CARTRIDGE WITH FIXED CUTTING BLADE AND RETRACTABLE SEATING TABLE

(75) Inventors: Jeffrey P. Jonker, DeKalb, IL (US); David Henke, Rochelle, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 10/137,535

(22) Filed: May 2, 2002

(51) Int. Cl.[7] .......................... B23P 23/00; B23P 19/00

(52) U.S. Cl. ...................... 29/566.4; 29/566.3; 29/750; 29/751; 29/758

(58) Field of Search ............................ 29/566.4, 566.3, 29/750, 751, 758; 7/107

(56) References Cited

U.S. PATENT DOCUMENTS

| | | | | | |
|---|---|---|---|---|---|
| 2,960,864 | A | * | 11/1960 | Watts | 29/747 |
| 3,708,852 | A | | 1/1973 | Mason | |
| 3,898,724 | A | * | 8/1975 | Conorich | 29/566.4 |
| 4,070,755 | A | * | 1/1978 | Carter | 29/764 |
| 4,161,061 | A | | 7/1979 | Mason et al. | |
| 4,241,496 | A | | 12/1980 | Gregson | |
| 4,271,573 | A | * | 6/1981 | von Roesgen | 29/33 M |
| 4,696,090 | A | | 9/1987 | Gregson et al. | |
| 4,958,427 | A | | 9/1990 | Smith et al. | |
| 5,175,921 | A | | 1/1993 | Krietzman | |
| 5,195,230 | A | | 3/1993 | Krietzman | |
| 5,604,948 | A | | 2/1997 | McMahon et al. | |
| 5,628,105 | A | | 5/1997 | Fallandy et al. | |
| 5,666,715 | A | * | 9/1997 | Zoiss et al. | 29/566.4 |
| 5,758,403 | A | * | 6/1998 | Fallandy | 29/566.4 |
| 5,813,109 | A | * | 9/1998 | Ziegler et al. | 29/566.4 |
| 5,842,268 | A | * | 12/1998 | Arnfield | 29/566.4 |
| 5,887,333 | A | * | 3/1999 | Clark | 29/566.4 |

* cited by examiner

*Primary Examiner*—A. L. Wellington
*Assistant Examiner*—Dana Ross
(74) *Attorney, Agent, or Firm*—Cook,Alex,McFarron,Manzo,Cummings & Mehler, Ltd.

(57) ABSTRACT

An impact tool for use by telecommunications personnel for the insertion of communications wires in a terminal block. The impact tool includes an impact tool cartridge having a seating blade and a cutting blade. The seating blade is retractable against a compression spring while the cutting blade is fixed so that upon the application of seating pressure to the impact tool, the seating blade retracts and the cutting blade is exposed to cut the wire. In another embodiment of the invention, a spring loaded detent supplements the compression spring in resisting retraction of the seating tool. A noise producing mechanism is located in the impact tool handle for producing an audible sound upon completion of the wire seating and terminating operations. A storage compartment for the seating and cutting blades is formed in the impact tool handle and has a door pivotally mounted for opening and closing movement relative to the handle.

10 Claims, 7 Drawing Sheets

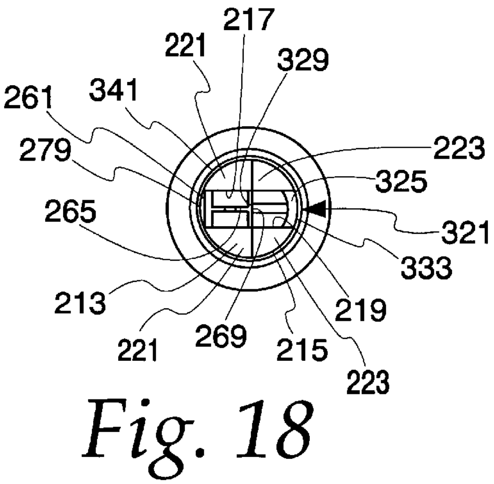
Fig. 18
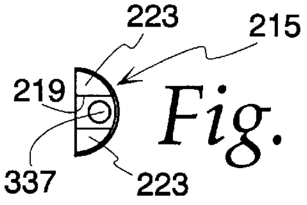
Fig. 19
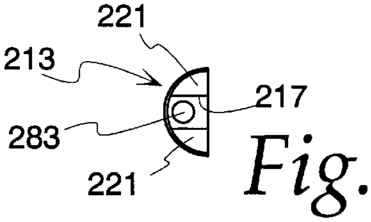
Fig. 22
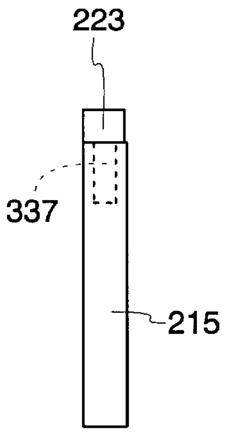
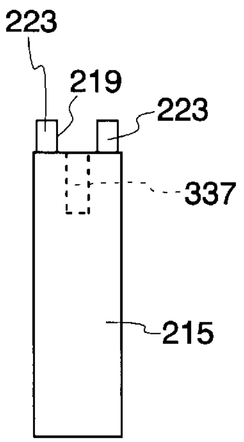
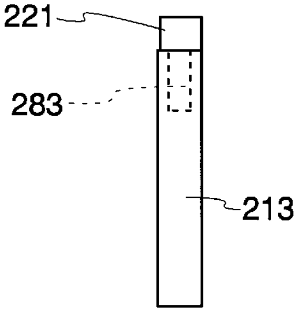
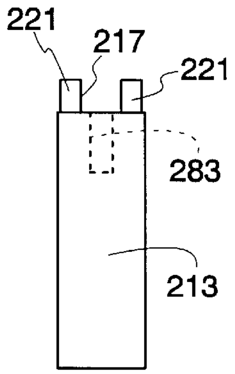
Fig. 20 Fig. 21 Fig. 23 Fig. 24
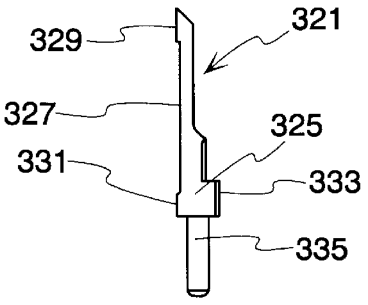
Fig. 25

IMPACT TOOL CARTRIDGE WITH FIXED CUTTING BLADE AND RETRACTABLE SEATING TABLE

BACKGROUND AND SUMMARY OF THE INVENTION

This invention is directed to an impact tool cartridge installable in a hand tool for use by telecommunication personnel for the insertion of communications wires into terminal blocks. In particular, the invention is directed to a self-contained cartridge having seating and cutting blades which can be installed in a conventional or an ergonomic tool handle. More particularly, the present invention is directed to a blade assembly having a retractable seating blade and a fixed cutting blade and to an impact tool cartridge in which the seating blade retracts upon a continuous application of pressure to the impact tool by a user pushing it against a terminal block until the cutting blade extends forwardly of the seating blade to engage and cut the wire.

An object of this invention is an impact tool cartridge having a blade assembly which seats and terminates a wire in a single continuous application of force by the user against the wire and the terminal block.

Another object of this invention is a wire termination impact tool cartridge having a blade assembly in which the seating blade is restrained against retraction by a compressible spring and the cutting blade is fixed.

An additional object of this invention is a wire termination impact tool cartridge having a blade assembly with a seating blade restrained against retraction by a compression spring supplemented by a spring biased detent.

Yet another object of this invention is a wire termination impact tool cartridge for insertion in an ergonomic handle in which the seating and cutting blades can be rotatably indexed relative to the ergonomic handle by rotating the cartridge relative to the ergonomic handle.

Still another object of this invention is a blade assembly of a seating blade and a cutting blade which are held in closely engaging contact during retraction of the seating blade by a compression collar which engages the bases of the seating and cutting blades and forces the tips of seating and cutting blades against each other.

A further object of this invention is an impact tool cartridge adaptable to 66-type or 110-type blades.

Yet a further object of this invention is a wire termination impact hand tool which provides an audible sound upon completion of the wire seating and terminating operations.

Yet a still further object of this invention is a wire termination impact hand tool which has a storage compartment for additional blades in its handle.

BRIEF DESCRIPTION OF THE DRAWINGS

The invention is illustrated more or less diagrammatically in the following drawings wherein:

FIG. 18 is a top plan view of the tool cartridge of the second embodiment of the invention with the cap removed to show the seating and cutting tools;

FIG. 19 is a top plan view of the tool cartridge cutting tool holder;

FIG. 20 is a side elevational view of the tool cartridge cutting tool holder;

FIG. 21 is a front elevational view of the tool cartridge cutting tool holder;

FIG. 22 is a top plan view of the tool cartridge sea ting tool holder;

FIG. 23 is a side elevational view of the tool cartridge seating tool holder;

FIG. 24 is a front elevational view of the tool cartridge seating tool holder;

FIG. 25 is a side elevational view of a wire cutting blade.

DESCRIPTION OF THE PREFERRED EMBODIMENTS

Figure 7:
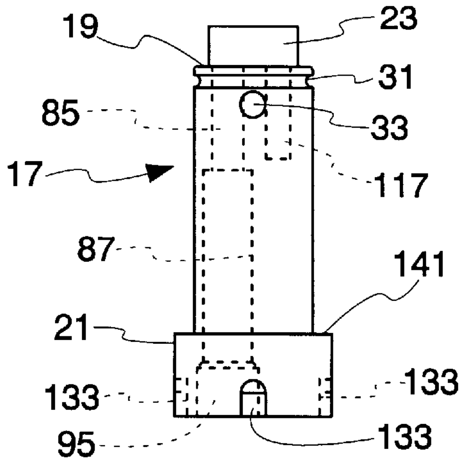
FIG. 7 is a side elevational view of the tool cartridge with the cutting blades, cap and other parts removed for clarity of illustration.
Figure 8:
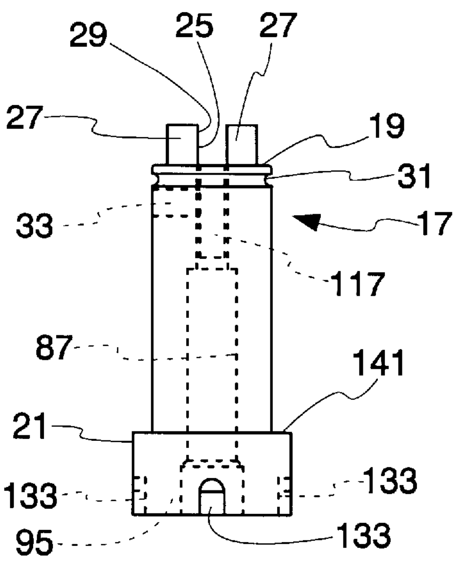
FIG. 8 is a view of the tool cartridge similar to that of FIG. 7 but showing the tool cartridge rotated 90° from the view of FIG. 7.
Figure 14:
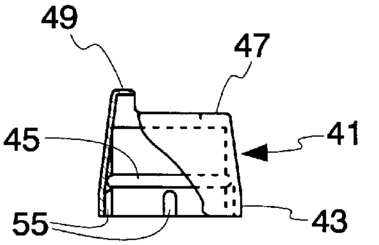
FIG. 14 is a side elevational view of the cartridge cap of FIG. 5 with parts broken away and others shown in dashed lines for clarity of illustration.
Figure 15:
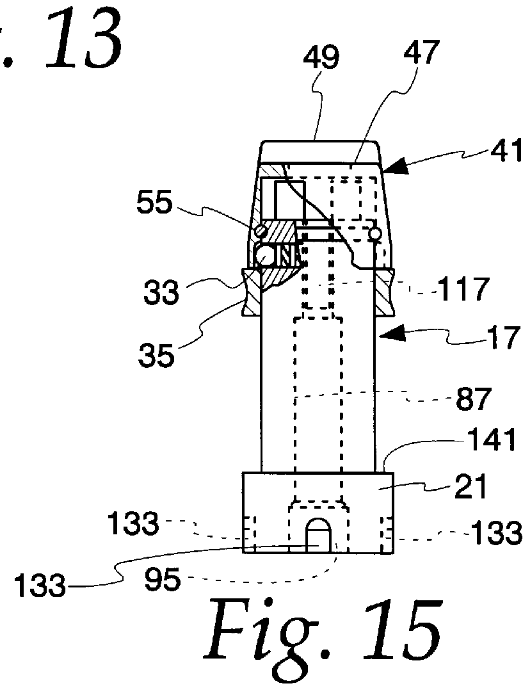
FIG. 15 is a side elevational view of the tool cartridge of this invention with parts omitted and other parts shown in dashed lines or broken away for clarity of illustration.

FIGS. 1–15 show a first embodiment of the invention which utilizes "66-type" and "110-type" blades for seating and connecting communications wire to a terminal block. This embodiment includes a tool cartridge 11 which can be installed in an impact hand tool 13 having an ergonomic handle which consists of body sections 15 joined along a longitudinal plane. The body sections can be joined in any suitable manner to contain the tool cartridge which includes a cylindrical cartridge body 17 having a tool end wall 19 and an enlarged base end 21. A neck 23 extends longitudinally outwardly from the tool end wall and a diametrically extending slot 25 is cut or formed in the neck to divide the neck into segments 27 as shown most clearly in FIGS. 7 and 8 of the drawings. As can be best seen in FIG. 8 of the drawings, the slot 25 is open at diametrical ends 29. An outwardly facing annular groove 31 is formed in the cartridge longitudinally inwardly of the tool end wall 19 as is most clearly shown in FIGS. 7 and 8 of the drawings. As is best shown in FIGS. 7 and 15 of the drawings, a ball detent 33 is formed in the cartridge body 17 longitudinally inwardly of the slot 31. A collar 35 is attached to the body and is located longitudinally inwardly of the ball detent as can be best seen in FIG. 15.

Figure 1:
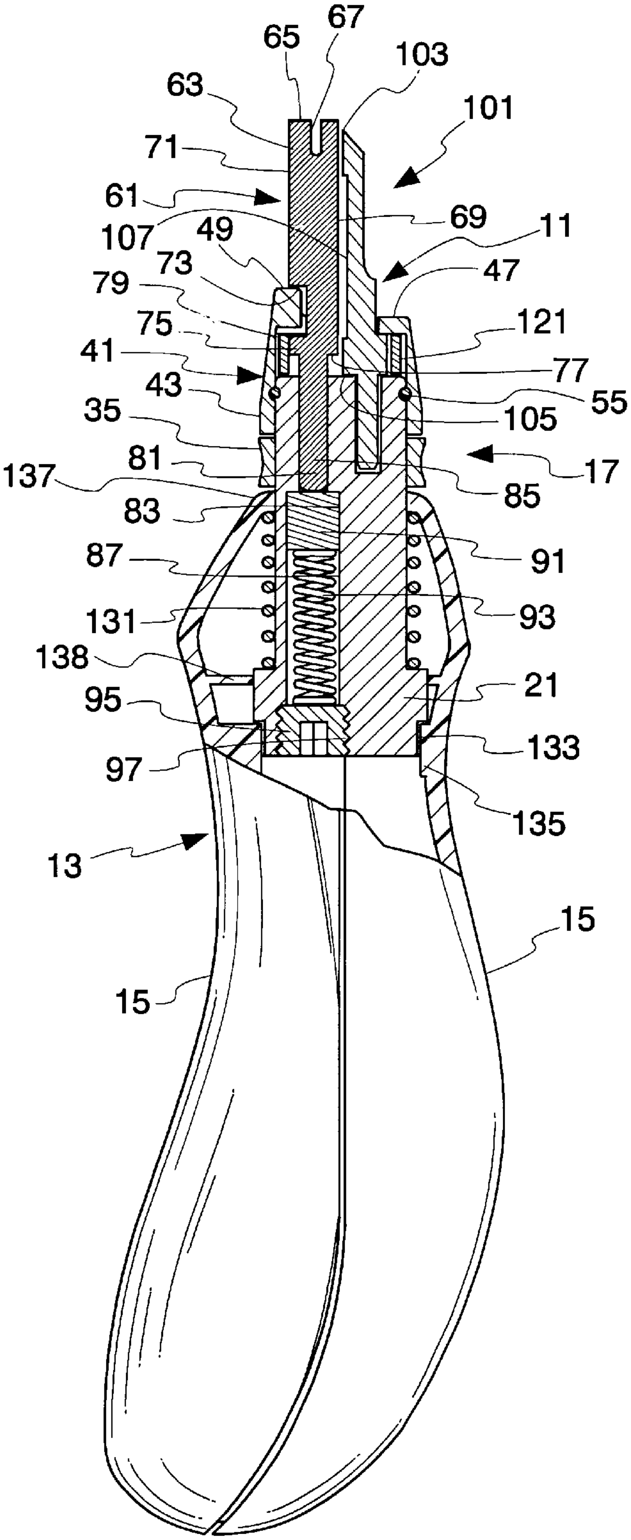
FIG. 1 is a longitudinally extending transverse cross sectional view taken through one embodiment of the impact tool cartridge of this invention and showing the tool cartridge in its locked position and mounted in an ergonomic tool handle.
Figure 2:
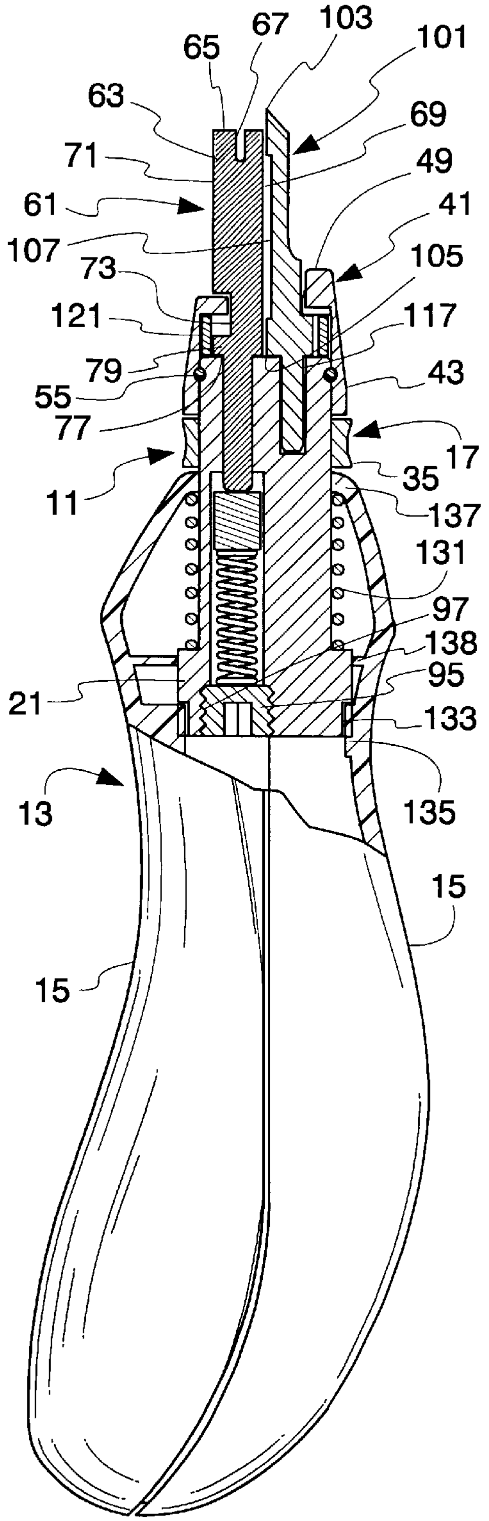
FIG. 2 is a view similar to the view of FIG. 1 but showing the tool cartridge cutting blade in its cutting position as would occur when the seating tool has been fully retracted by seating pressure against the tool handle.
Figure 5:
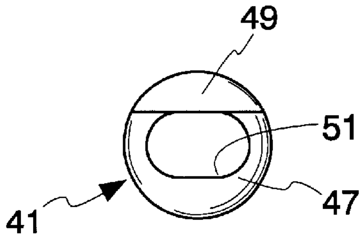
FIG. 5 is a top view of the tool cartridge cap.
Figure 6:
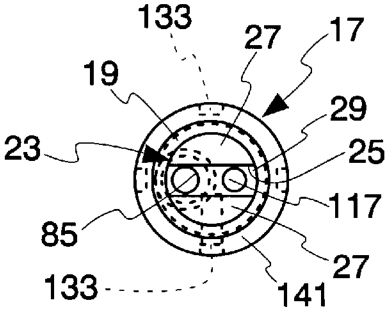
FIG. 6 is a top view of the tool cartridge with the cap and blades removed.
Figure 9:
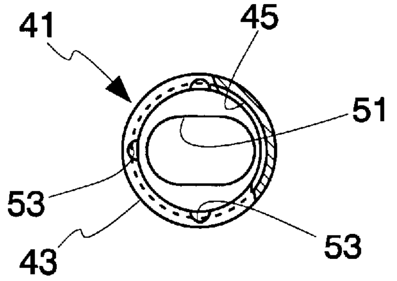
FIG. 9 is a bottom view of the tool cartridge cap of FIG. 5 with a portion broken away.

Referring now to FIGS. 1 and 2 of the drawings, a metal cap 41 is rotatably mounted on the cylindrical cartridge body 17. The cap includes a skirt 43 having an inwardly facing annular groove 45 formed therein as shown in FIG. 14 of the drawings. A front wall 47 is formed on the cap and a protrusion 49 extends outwardly of the front wall 47 as also shown in FIGS. 5 and 14. An oval opening or passage 51 as shown in FIG. 5 of the drawings extends through the front wall 47 of the cap. Inwardly facing longitudinally extending notches 53 are formed on the inside of the skirt 43 and are located around the interior periphery thereof as shown in FIG. 9 of the drawings. A locking filament 55 fits into the groove 31 on the cartridge body and the inwardly facing groove 45 in the skirt as shown in FIGS. 1 and 2 to fasten the cap.

A seating blade member 61 is shown in FIGS. 1 and 2 of the drawings. It includes a seating blade portion 63 having a wire contacting surface 65 at its outer end. A seating notch 67 is provided at the tip of the seating blade. A flat wall 69 radially inwardly facing is formed on the seating blade and an outwardly facing arcuate wall 71 is formed on the. opposite longitudinal side of the seating tool. A notch 73 is formed in the arcuate wall 71. An enlarged base 75 is formed beneath the notch 73 and a bottom wall 77 is formed on the under side of the base. The base has an arcuate radially outwardly facing wall 79 shown in FIGS. 1, 2 and 10. A guide pin 81, which is of circular cross section, extends from the base 75. A longitudinally extending passage 83 is formed through the cartridge and includes a smaller diameter portion 85 which receives the guide pin 81 of the cutting blade. This smaller diameter passage for the guide pin opens into a larger diameter passage 87 farther inward of the tool cartridge.

A piston 91 is positioned in the larger diameter passage 87 with one end of the piston engaging the guide pin 81 of the seating blade and the other end of the piston being engaged by a compression spring 93. The compression spring 93 is held in position in the passage 87 by a threaded plug 95 which threads into a threaded socket at the end of the passage 87.

Figure 12:
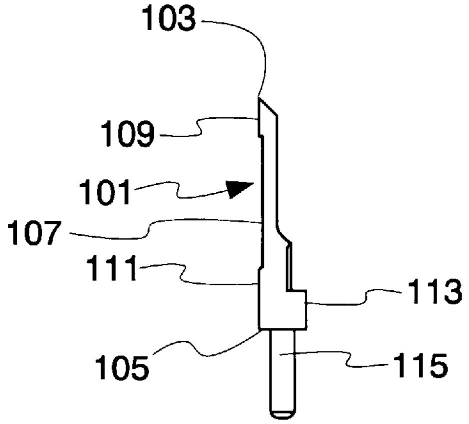
FIG. 12 is a side elevational view of a wire cutting blade.

A cutting blade member 101 is shown in FIGS. 1, 2 and 12 of the drawings. The cutting blade member has a sloped surface ending in a cutting tip 103 at its wire engaging end. An enlarged base 105 is formed at the opposite end of the cutting blade member. The cutting blade includes a flat inside facing wall 107 which extends a substantial length of the cutting blade. Its opposite ends are defined by an offset flat wall 109 at the blade tip and an offset flat wall 111 at the base both offset laterally outwardly of the wall 107. The base has an arcuate shaped outside wall 113 and a guide pin 115 extending therefrom which guide pin fits into a socket 117 in the cylinder body.

Figure 10:
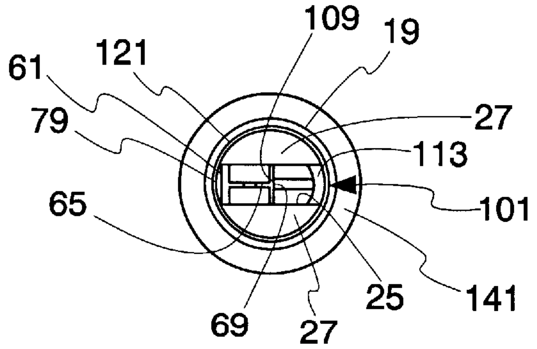
FIG. 10 is a top plan view of the tool cartridge with the cap removed to show the seating and cutting tools.
Figure 11:
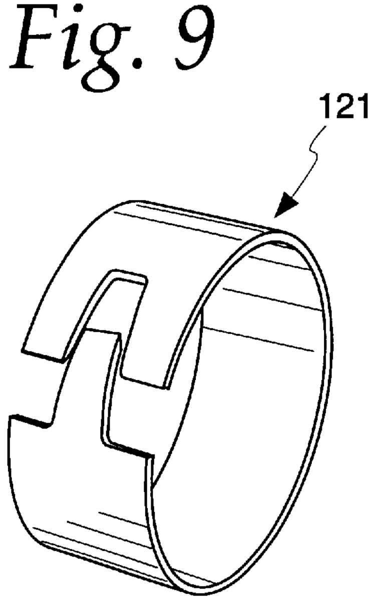
FIG. 11 is an orthogonal view of a compression ring.

Referring now to FIGS. 1, 2, 10 and 11 of the drawings, a compression ring 121 fits over the neck segments 27 of the neck 23 of the tool cartridge body 17 as shown specifically in FIGS. 1, 2 and 10 to engage also the arcuate outside wall 79 of the base 75 of the seating blade 61 and the arcuate outside wall 113 of the base 105 of the cutting blade member 101. The arcuate outside wall 79 of the base of the seating tool and the arcuate outside wall 113 of the base of the cutting blade extend through the openings 29 at the diametrical ends of the slot 25 in the neck 23 to engage the compression ring. The inwardly acting force of the compression ring pushes the offset flat wall 109 at the tip of the blade 101 and the offset flat wall 111 at the base of the blade 101 in contact with the flat wall 69 of the seating tool 61 without the need to form all facing surfaces of the seating and cutting blades to close tolerances.

Figure 3:
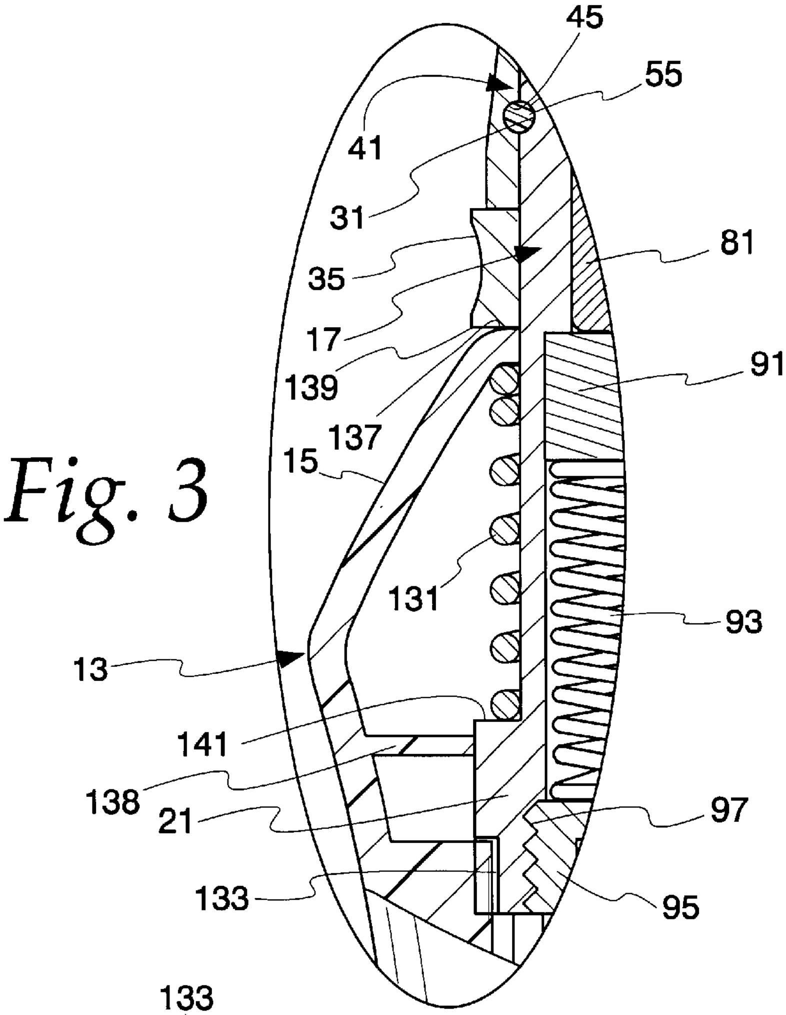
FIG. 3 is an enlarged partial cross sectional veiw showing a detail of the tool cartridge and the ergonomic handle of this invention.
Figure 4:
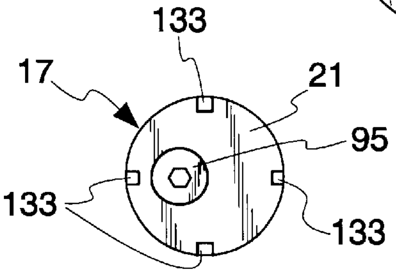
FIG. 4 is a bottom view of the tool cartridge.
Figure 13:
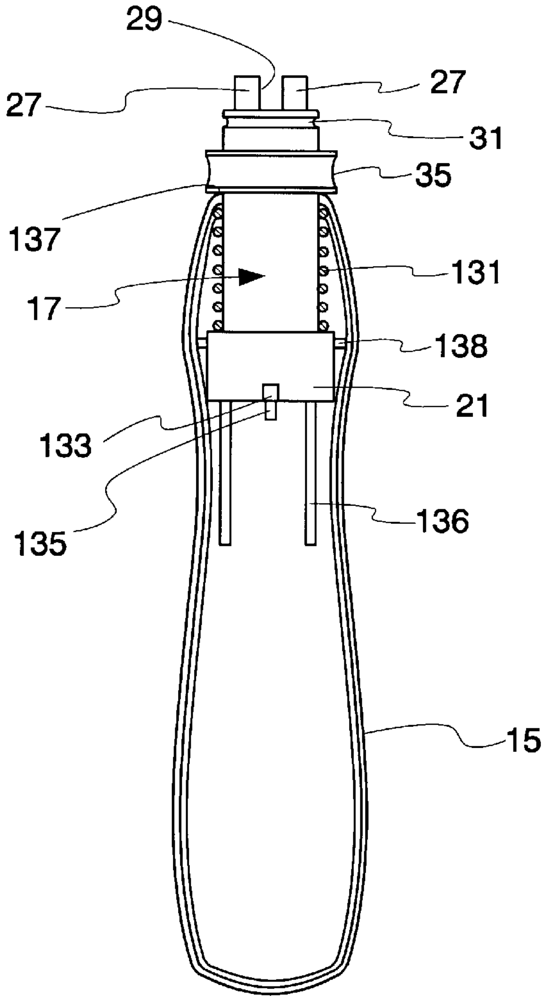
FIG. 13 is a side elevational view of a tool cartridge of this invention mounted on half of an ergonomic handle with parts omitted for clarity of illustration.

As shown in FIGS. 1 and 2, partially in enlarged detail in FIG. 3 and in FIG. 13 of the drawings, an indexing spring 131 operates in conjunction with indexing notches 133 in the enlarged base 21 of the cylindrical tool cartridge body 17 to enable the entire cartridge to be rotated to positions 90° apart relative to the body sections 15 of the ergonomic handle of the impact tool 13. Indexing ribs 135 are formed on the insides of the body sections 15 for engagement with the indexing notches 133. These indexing ribs are located between support ribs 136 also formed on the insides of the body sections 15 so that the enlarged base 21 of the cartridge can be supported on the ribs 136 with indexing ribs 135 extending into notches 133 of opposite handle sections 15. Thus, the cartridge body is supported and held in a fixed position relative to the body sections 15 after rotatable adjustment relative to the body sections. The ends 137 of the body sections 15 are trapped between the spring 131 and the under surface 139 of collar 34 and the support ribs 136 of the body sections 15 support the enlarged base end 21 to support the tool cartridge body in the body sections. An annular rib 138 is formed on the inside of the body section 15 to engage the enlarged base end 21 of the cartridge body 17 to maintain the cartridge body in alignment as it is moved longitudinally relative to the body sections during indexing.

FIGS. 16–25 of the drawings show a second embodiment of the invention which also utilizes "66-type" and "110-type" blades for seating and connecting a communication wire to a terminal block. This second embodiment includes a tool cartridge 197 which can be installed in an impact hand tool 199 of the type having an ergonomic handle which consists of body sections 201 joined along a longitudinal axis. The body sections 201 can be joined in any suitable manner to contain the tool cartridge which includes a cylindrical cartridge body 203 having a cylindrical tubular portion 205. A base portion 207 of the cartridge body having an enlarged end 208 is attached to the tubular portion 205. An open tool receiving end 209 of the tubular portion 205 is located at the opposite end of the tubular portion from the enlarged end 208. The base portion is telescoped into a receiving end 211 of the tubular portion 205 as shown most clearly in FIGS. 16 and 17 of the drawings.

Figure 16:
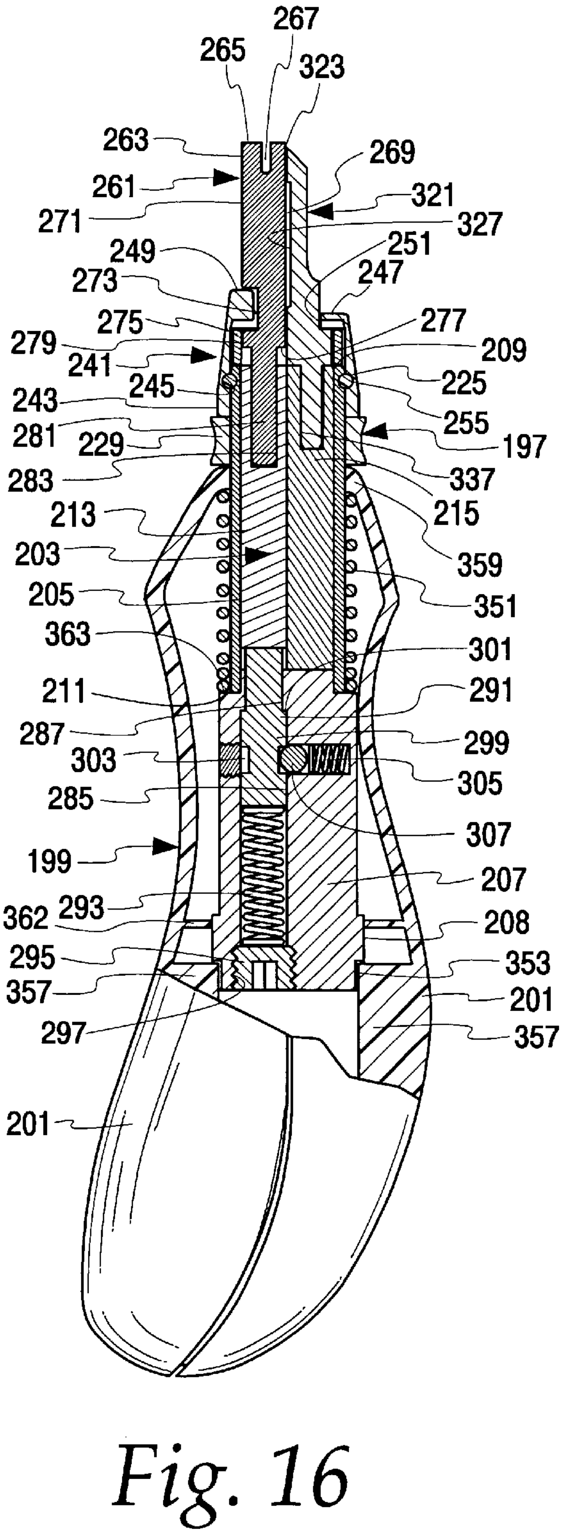
FIG. 16 is a longitudinally extending transverse cross sectional view of a second embodiment of the impact tool cartridge of this invention positioned in an ergonomic handle and showing the cartridge blades in their locked positions.
Figure 17:
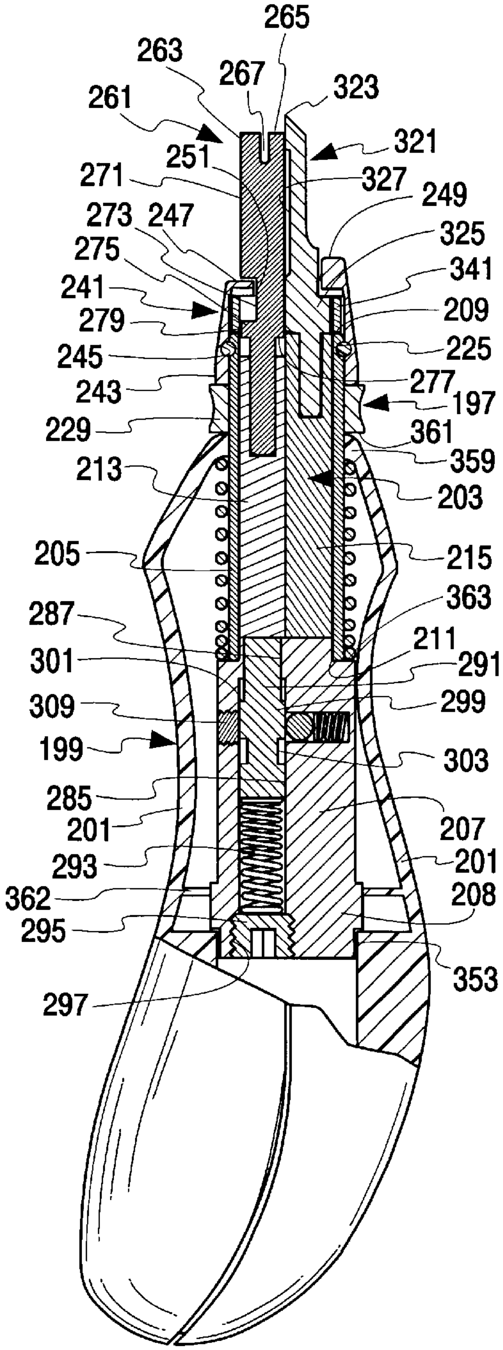
FIG. 17 is a view similar to that of FIG. 16 but showing the cutting blade of the tool cartridge in its cutting position.

A seating tool holder 213 is shown assembled in the impact tool in FIGS. 16, 17 and 18 of the drawings and in detail in FIGS. 22, 23 and 24. This seating tool holder is elongated with a semi-circular transverse cross section as can be seen most clearly in FIG. 22 of the drawings. A cutting tool holder 215 is shown assembled in the impact tool in FIGS. 16, 17 and 18 and is shown in disassembled detail in FIGS. 19, 20 and 21 of the drawings. This cutting tool holder is also semi-circular in transverse cross section as shown most clearly in FIG. 19 of the drawings. A notch 217 is formed in the top of the seating tool holder 213 and a similar notch 219 is formed in the top of the cutting tool holder 215. These notches also provide corner posts 221 in the seating tool holder 213 and corner posts 223 in the cutting tool holder 215 as shown most clearly in FIGS. 18–24 of the drawings.

Referring now to FIGS. 16 and 17 of the drawings, a collar 229 is attached to the tubular portion 205 of the cartridge body 203 inwardly from the open end 209 of the tubular portion. A metal cap 241 is rotatably mounted on the cylindrical cartridge body 203. The cap includes a skirt 243 having an inwardly facing annular groove 245 formed therein. A front wall 247 is formed on the cap and a protrusion 249 extends outwardly of the front wall 247. An oval opening or passage 251 extends through the front wall 247 of the cap. A locking filament 255 fits into the outwardly opening annular groove 225 of the cartridge body 203 and the inwardly facing annular groove 245 in the skirt 243 to fasten the cap to the cartridge body.

A seating blade member 261 is shown in FIGS. 16, 17 and 18 of the drawings. It includes a seating blade portion 263 having a wire contacting surface 265 at its outer end. A seating notch 267 is provided at the tip of the seating blade. A radially inwardly facing flat wall 269 is formed on the seating blade and an outwardly facing arcuate wall 271 is formed on the opposite longitudinally extending side of the seating tool. A notch 273 is formed in the arcuate wall 271. An enlarged base 275 is formed beneath the notch 273 and a bottom wall 277 is formed on the underside of the base. The base has an arcuate radially outwardly facing wall 279 shown in FIG. 18. A guide pin 281, of circular cross section, extends from the bottom wall 277 of the base and seats in a socket 283 formed in the seating tool holder 213. A longitudinally extending passage 285 is formed in the base portion 207 of the cartridge body 203. This passage is reduced in diameter at portion 287 adjacent the receiving end 211 of the tubular portion 205 of the cartridge body.

A piston 291 is positioned in the passage 285 in the base portion 207 of the cartridge body 203. One end of the piston engages the cartridge body 203 and the opposite end is engaged by a compression spring 293 held in the passage 285 by a threaded plug 295 which is seated in a threaded socket 297 in the base portion 207 of the cartridge body. The piston 291 has an enlarged portion 299 with a shoulder 301 which limits movement of the piston in the enlarged passage 285. A circumferential extending groove 303 formed in the piston aligns with a transverse blind passage 305 formed in the base portion 207 of the cartridge body. A ball detent 307 with a spring is located in the transverse blind passage and engages the circumferential notch 303 on the piston to restrain the piston against movement. A threaded plug 309 closes the blind passage 305.

A cutting blade member 321 is shown in FIGS. 16, 17, 18 and 25 of the drawings. The cutting blade member has a sloped surface ending in a cutting tip 323 at its wire engaging end. An enlarged base 325 is formed at the opposite end of the cutting blade member. The cutting blade includes a flat inside facing wall 327 which extends a substantial length of the cutting blade. Its opposite ends are defined by an offset wall 329 at the blade tip and an offset flat wall 331 at the base both offset laterally outwardly of the wall 327. The base has an arcuate shaped outside wall 333 and a guide pin 335 extending therefrom which guide pin fits into a socket 337 in the cutting tool holder.

As shown in FIGS. 16, 17 and 18 of the drawings, a compression ring 341 fits over the corner posts 221 and 223 of the seating tool holder 213 and cutting tool holder 215. The compression ring engages the arcuate outside wall 279 on the enlarged base 275 of the seating blade member 261 and the arcuate outside wall 333 of the enlarged base 325 of the cutting blade member 321. The arcuate outside wall 279 of the base 275 of the seating tool and the arcuate outside wall 333 of the base 325 of the cutting blade member 321 extend outwardly of the slots 217 and 219 of the seating tool holder and cutting tool holder to engage the compression ring. The radially inwardly acting force of the compression ring pushes the offset flat wall 329 at the tip of the cutting blade 321 and the offset flat wall 331 at the base of the blade 321 into contact with the flat wall 269 of the seating blade member 261 without the need to form all facing surface of the seating and cutting blade members to close tolerances.

As shown in FIGS. 16 and 17 of the drawings, an indexing spring 351 operates in conjunction with indexing notches 353 in the enlarged end 208 of the cartridge body 203 to enable the entire cartridge to be rotated to positions 90° apart relative to the body shells 201 of the ergonomic handle of the impact tool 199. Indexing ribs 357 are formed on the insides of the body sections 201 for engagement with the indexing notches 353. These indexing ribs are located between support ribs (not shown but similar to ribs 136 of FIG. 13) also formed on the inside of the body sections 201 so that the enlarged base 208 of the cartridge body is supported on the support ribs with an indexing rib 357 extending into an indexing notch 353 of opposite handle sections. Thus, the cartridge body is supported and held in a fixed position relative to the body sections 201 after rotatable adjustment relative to the body sections. The ends 359 of the body sections 201 are trapped between the indexing spring 351 and the under surface 361 of the collar 229. Annular rib 362 is formed on the insides of the body sections 201 to engage the enlarged base end 208 of the cartridge body 203 to maintain the cartridge body in alignment as it is moved longitudinally relative to the body sections during indexing.

Figure 26:
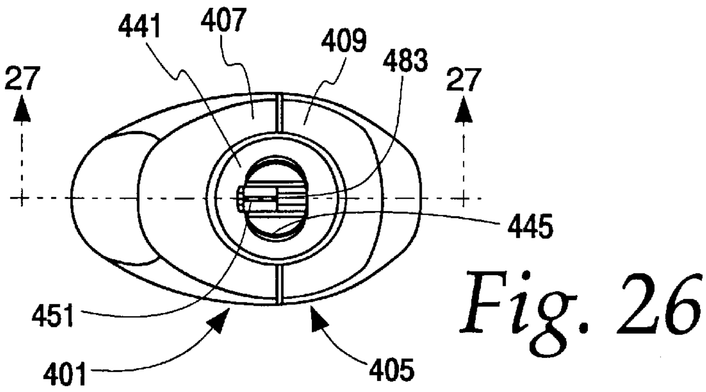
FIG. 26 is a top plan view of a third embodiment of an impact hand tool of this invention.
Figure 27:
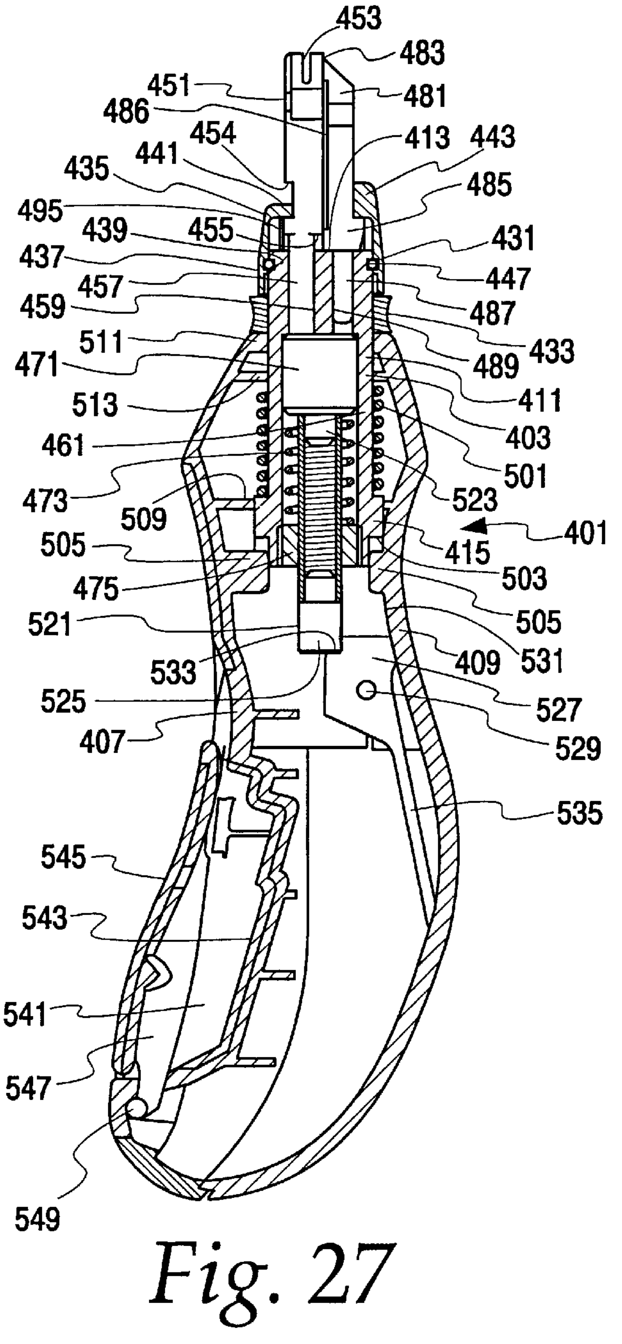
FIG. 27 is a longitudinally extending transverse cross section view taken along line 27—27 of FIG. 26.
Figure 28:
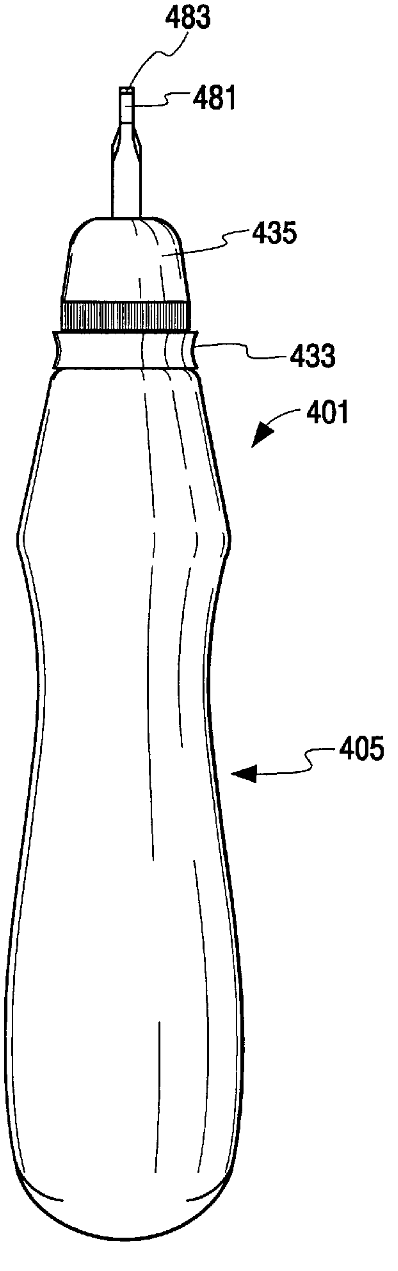
FIG. 28 is an elevational view of the impact hand tool of this embodiment of the invention.

FIGS. 26–28 of the drawings show a third embodiment of the invention which also utilizes “66-type” and “110-type” blades for seating and connecting a communication wire to a terminal block. The third embodiment of the invention is incorporated in an impact hand tool 401 which includes a tool cartridge 403 installed in an ergonomically shaped handle body 405 which consists of body sections 407 and 409 joined along a transverse longitudinal axis. The body sections 407 and 409 can be joined in any suitable manner to contain the tool cartridge which includes a cylindrical tool cartridge body 411. The tool cartridge body 411 includes a tool end wall 413 and an enlarged end portion 415. A neck extends longitudinally outward from the tool end wall 413 and a diametrically extending slot is cut or formed in the neck to divide the neck into segments. The slot is opened at its diametric ends. These features are not shown for this embodiment of the invention but they are similar in construction to the neck 23 of the embodiment of FIGS. 1–15 of this application.

An outwardly facing annular groove 431 is formed in the tool cartridge 403 and located slightly longitudinally inwardly of the tool end wall 413. A ball detent may be formed in the tool cartridge body 411 and located longitudinally inwardly of the annular groove 431 but this is not shown in the drawings. A collar 433 is attached to the cylindrical tool cartridge body 411 at allocation longitudinally inwardly of the annular groove 431.

A metal cap 435 is rotatably mounted on the cylindrical tool cartridge body 411. The cap includes a skirt 437 having an inwardly opening annular groove 439 which aligns with the outwardly facing annular groove 431 of the tool cartridge 403 when the metal cap is positioned on the tool end wall 413 of the cylindrical tool cartridge body 411. A front wall 441 is formed on the cap and a protrusion 443 extends outwardly of the front wall 441. An oval opening or passage 445 extends through the front wall 441 of the cap. The cap is rotatably mounted on the tool end wall 413 to indexable positions determined by inwardly facing longitudinally extending notches formed on the inside of the skirt 437 around the interior periphery thereof in the same manner as described in the first embodiment of this invention. A locking filament 447 fits into the grooves 431 and 439 to secure the cap to the cylindrical tool cartridge 411.

A seating blade member 451 is provided with a seating blade portion and a wire contacting surface. A seating notch 453 is provided at the tip of the seating blade. A locking notch 454 is formed in the side of the seating blade member. An enlarged base 455 is formed on the seating blade longitudinally below the locking notch 454. A guide pin 457, which is smaller width than the base, extends longitudinally from the base of the seating blade and into a passage 459 which passage extends inwardly in a direction away from the tool end wall 413 of the cartridge. The passage 459 connects with a larger diameter passage 461 which extends through the remainder of the cylindrical tool cartridge body 411.

A piston 471 is installed in passage 461 for reciprocal movement and is biased into contact with the end of the guide pin 457. A compression spring 473 also positioned in the passage 461 engages the piston 471 and a threaded plug 475 in a threaded socket at the end of the passage 461.

A cutting blade member 481 has a sloped surface ending in a cutting tip 483 at its wire engaging end. An enlarged base 485 is formed at the opposite end of the cutting blade member. An undercut flat inside facing wall 486 which extends a substantial length of the cutting blade is formed between offset walls at the blade tip and enlarged base in the same manner as described for cutting blade member 321. A guide pin 487 of smaller size than the enlarged base extends therefrom into a passage 489 formed in the tool cartridge body 411 and extending parallel to passage 459. The enlarged base 485 of the cutting blade engages the tool end wall 413 of the tool cartridge body 411 to prevent longitudinal movement of the cutting blade member relative to the tool cartridge body. A compression ring 495 fits over the neck segments of the neck of the tool cartridge body and the enlarged bases 455 and 485 of the seating and cutting blades to secure them to the tool cartridge in the same manner as described for the compression ring 121 of the first embodiment of this invention.

An indexing spring 501 operates in conjunction with indexing notches 503 in the enlarged base 415 of the cylindrical tool cartridge body 411 to enable the entire tool cartridge body to be rotated to and secured in positions 90° apart relative to the body sections 407 and 409 of the ergonomic handle of the impact hand tool 401. Indexing ribs 505 are formed on the inside walls of the body sections 407 and 409 for engagement with the indexing notches 503. Support ribs (not shown) are also provided on the inside walls of the body sections so that the enlarged base 415 of the tool cartridge body can be supported on the ribs with the indexing ribs 505 extending into the indexing notches 503 of the opposite body sections 407 and 409. Thus, the tool cartridge body can be supported and secured in a fixed position of rotation relative to the body sections 407 and 409 after indexing. Annular rib 509 is formed on the insides of the body sections 407, 409 to engage the enlarged base end 415 of the cartridge body 411 to maintain the cartridge body in alignment as it is moved longitudinally relative to the body sections during indexing.

The ends 511 of the body sections engage the under surface of collar 433 and are biased thereagainst by an indexing spring 501 which engages body section partitions 513 spaced from the ends 511 of the body sections.

A plunger 521 formed of a tightly coiled wire partially telescopes over a projection 523 formed integrally with the piston 471. The plunger extends outwardly of the tool cartridge body terminating in an open end. A plug 525 is inserted in the open end of the plunger 521, the plug engages a hammer 527 which is pivotally mounted on a shaft 529 located inside the handle body 405 for movement towards and away from the interior of the wall of the body section 409. The hammer includes a head 531 which is normally biased into contact with the wall of the body section 409. The plug 525 of the plunger 521 engages a shoulder 533 of the hammer in a location off center relative to the pivotal shaft 529 of the hammer. An end of a flexible spring tail 535 engages the interior wall of the body section 409.

A tool holding compartment 541 is formed in the handle body section 407 to store both "66-type" and "110-type" blades when they are not in use. The compartment includes an interior wall 543 and an exterior door 545. The door is attached to an arm 547 mounted on a pivot 549 for opening and closing of the tool holding compartment door.

USE, OPERATION AND FUNCTION OF THIS INVENTION

The operation of the tool cartridges 11 and 197 are essentially the same and will be described simultaneously. Any differences in operation due to their slightly different constructions will be noted. FIGS. 1 and 16 of the drawings show the cartridge 11, 197 in a position in which its seating blade member 61, 261 is in a locked position in which the seating blade cannot be moved longitudinally relative to the cutting blade. This locked position is appropriate when the cartridge is carried by a worker or when the impact tool is intended to be used to only seat and not cut a wire in a terminal block. As can best be seen in FIGS. 1 and 16, the seating blade member 61, 261 is locked against longitudinal movement relative to the cartridge 11, 197, by a protrusion 49, 249 on the rotatably mounted cap 41, 241 which protrusion seats in a notch 73, 273 in the seating member blade 61, 261.

To change the cartridge 11, 197 to a cutting mode, the rotatably mounted cap 41, 241 is rotated from its position shown in FIGS. 1 and 16 to the position shown in FIGS. 2 and 17. In this latter position of rotation of the cap, the thinner annular wall 47, 247 of the cap is now positioned in the notch 73, 273 in the side of the seating blade portion 63, 263 thus allowing longitudinal movement of the seating blade relative to the cartridge. With the seating blade member 61, 261 in a position in which it can move longitudinally relative to the cartridge 11, 197, the seating blade member 61, 261 is placed against a terminal board and wire and a seating force is applied against the base end 21, 207 of the cartridge 11, 197 through the impact tool handle. The seating blade member 61, 261 moves longitudinally towards the base end 21, 207 of the cartridge 11, 197 engaging the piston 91, 291 and compressing the spring 93, 293. As the wire contacting surface 65, 265 of the seating blade member 61, 261 moves longitudinally inwardly of the cutting edge 103, 323 of the cutting blade member 101, 321, the cutting edge 103, 323 engages and cuts the communications wire. This movement of the seating blade member relative to the cutting edge of the cutting blade member is quite rapid as the compression force of the spring is overcome by seating pressure applied to the impact tool handle.

The cartridge 11 of the first embodiment of the invention, FIGS. 1–15, utilizes only a compression spring 93 to resist rearwardly longitudinal movement of the seating blade member 61 relative to cutting edge 103 of the cutting blade member 101. In the embodiment of FIGS. 16–25 of the drawings, a spring biased detent 307 assists the compression spring 293 in resisting rearwardly longitudinal movement of the seating blade member 261 relative to the cutting edge 323 of the cutting blade member 321. In both embodiments of the invention, the cutting edge 103, 323 of the cutting blade member 61, 321 is forced against the communication wire to cut it as seating pressure is applied to the seating blade member 61, 261 since this pressure rapidly compresses the spring 93, 293 and moves the seating tool wire contact surface 65, 265 longitudinally rearwardly of the cutting edges 103, 323. The spring bias detent 307 causes a buildup of pressure in the compression spring 293 until the holding effect of the detent is overcome. Then, the seating blade member snaps rearwardly.

The tool cartridge 11, 197 can be rotated relative to the ergonomic tool handle without removing the tool cartridge from its installed position between the handle body sections 15, 201. The ability to rotate the tool cartridge relative to the handle, particularly, an ergonomic handle, permits the user to access terminal blocks in hard to reach locations while enabling the user to maintain a proper grip on the handle. This is accomplished by lifting the tool cartridge 11, 197 by its collar 35, 229 against the force of the compression spring 131, 351 to disengage the index notch engaging ribs 135, 357 of the handle body sections 15, 201. The tool cartridge can then be rotated in 90° increments to reposition the tool cartridge 11, 197 and its blades relative to the tool handle. Releasing the tool cartridge allows the compression spring to return the base of the tool cartridge into engagement with the base support ribs 136, 357 and the indexing notch engaging ribs 135, 357 of the tool handle body sections to secure the tool cartridge in its new position of rotation. The annular ribs 138, 362 formed on the inside of the body sections 15, 201 remain in engagement with the enlarged base end 21, 208 of the tool cartridge 11, 197 during longitudinal movement of the tool cartridge 11, 197 to prevent it from skewing during indexing.

A third embodiment of the invention is shown in FIGS. 26–28 of the drawings. This embodiment is in the form of an impact ergonomic hand tool 401 in which is installed a tool cartridge 403. The ergonomic shaped handle body 405 is formed of longitudinally split body sections 407 and 409 which are joined together along a longitudinal plane. The body sections can be joined in any suitable manner to contain the tool cartridge 403 which includes a cylindrical tool cartridge body 411 having a tool end wall 413 and an enlarged base end 415. In the same manner as described and shown in connection with the first embodiment of this invention, a neck extends longitudinally outward from the tool end wall 413 and a diametrically extending slot is cut or formed in the neck to divide the neck into segments. This slot is open at diametrical ends 29 of the neck. The bases 455 and 485 of the seating blade member 451 and cutting blade member 481, respectively, are located in and extend diametrically outwardly of the slot to be engaged by the compression ring 495. An outwardly facing annular groove 431 is formed in the cartridge longitudinally inward of the tool end wall 413 as can best be seen in FIG. 27 of the drawings. A ball detent, which is not shown, is formed on the cartridge body longitudinally inwardly of the slot 431. A collar 433 is attached to the body and is located longitudinally inwardly of the ball detent in the same manner as shown in the impact tool of the first embodiment of this invention.

A metal cap 435 is rotatably mounted on the cylindrical tool cartridge body 411. The cap includes a skirt 437 having an inwardly facing annular groove 439 formed therein. A front wall 441 is formed on the cap and a protrusion 443 extends outwardly of the front wall 441 as shown in FIG. 27 of the drawings. An oval opening or passage 445 extends through the front wall 441 of the cap. The cap is rotatable to various indexable positions through the use of longitudinally extending notches which are formed inside of the skirt 437 and located around the interior periphery thereof and which engage a ball detent formed in the cartridge body longitudinally inwardly of the outwardly facing annular groove 431 but not shown in the drawings of this embodiment of the invention. A locking filament 447 fits into the groove 431 on the cartridge body and the inwardly opening annular groove 439 formed in the skirt to fasten the cap to the cartridge body in a manner which permits rotation of the cap relative to the cylindrical tool body 411.

The impact hand tool 401 is shown in its unlocked and ready to use condition in FIGS. 26 to 28 of the drawing. To lock the tool in a position in which the seating blade member 451 is prevented from rearward movement, the metal cap 435 is rotated 180° to position the protrusion 443 of the cap in the locking notch 454.

The wire seating and cutting functions of the seating blade member 451 and the cutting blade member 481 are performed in the same manner as previously described for the similar members of the first embodiment of this invention. In this embodiment of the invention, rearwardly movement of the seating blade member guide pin 457 forces the piston 471 and its attached plunger 521 into the handle body 405. Rearwardly movement of the plunger forces the plug 525, which is carried by the plunger, to engage the shoulder 533 of the hammer 527 to rotate the hammer head 531 in a counterclockwise direction as shown in FIG. 27 of the drawings away from the wall of handle body section 409. Continued rearwardly movement of the plug 525 will cause it to slide off the shoulder 533 of the hammer because of the flexible, coiled spring construction of the plunger 521. Upon disengagement of the plug from the hammer shoulder, the flexible spring tail 535, which has been bowed because of the rotation of the hammer, will snap back to its original straight configuration causing the hammer head 531 to sharply strike the wall of handle body section 409. The impact of the hammer head 531 with the body section wall will indicate to the tool user that the wire has been seated and cut and the seating blade member 451 has been returned to its original position by the compression spring 473.

What is claimed is:

1. A tool cartridge for seating and cutting a communications wire in a terminal block, said tool cartridge including:

an elongated cartridge having a tool end and a base end, a wire seating blade and a wire cutting blade mounted in said cartridge and extending longitudinally outwardly of said tool end thereof, said wire seating blade having a wire engaging surface and said wire cutting blade having a wire cutting edge, said blades extending outwardly of said tool end to position said wire engaging surface closely adjacent said wire cutting edge, said wire seating blade mounted in said cartridge for longitudinal movement relative to said cartridge and to said cutting blade, said wire cutting blade fixedly mounted against longitudinal movement relative to said cartridge, and a compression spring mounted in said cartridge to resist longitudinal movement of said wire seating blade in a direction towards said base end of said cartridge and relative to said cutting blade upon the application of seating pressure to said cartridge, said compression spring sized to compress upon the application of seating pressure to said cartridge to cause said wire engaging surface of said seating blade to move towards said base end of said cartridge and away from said cutting edge of said wire cutting blade.

2. The tool cartridge of claim 1 in which a detent assists said compression spring to resist longitudinal movement of said wire seating blade in a direction towards said base end of said cartridge.

3. The tool cartridge of claim 1 in which each of said seating and cutting blades has a longitudinal side contiguous to a longitudinal side of said other blade, each of said blades has a tip and a base, an undercut is formed in one of said contiguous longitudinal sides of one of said blades between said tip and said base and a compression ring biases said blades into contact with each other.

4. The tool cartridge of claim 1 including a cap rotatably mounted on said tool end of said cartridge for rotation between a first position in which said cap engages and prevents longitudinal movement of said wire seating blade relative to said cartridge and a second position in which said cap permits longitudinal movement of said seating blade relative to said cartridge.

5. The tool cartridge of claim 4 in which said cap is removably fastened to said cartridge.

6. The tool cartridge of claim 5 in which said cap is fastened to said cartridge by a monofilament.

7. The tool cartridge of claim 4 in which said cap includes an opening for passage of said wire seating blade and said wire cutting blade, said opening is oval in cross section to engage said blades to prevent removal of said blades through said opening in one position of rotation and to allow removal of said blades in another position of rotation.

8. A hand held impact tool for seating and cutting a communications wire in a terminal block, said impact tool including:

a handle formed of a pair of body shells which are joined longitudinally to each other to form an opening between them at one longitudinal end of said handle, a tool cartridge supported in said handle and extending outwardly through said opening formed by said pair of body shells, a collar formed on said tool cartridge and having an undersurface which engages said longitudinal ends of said body shells, said tool cartridge having a shoulder and a base positioned in said handle, rotational indexing notches formed in said base, base support ribs and indexing notch engaging ribs formed on said body shells, a compression spring trapped between said shoulder of said tool cartridge and said longitudinal ends of said body shells to permit longitudinal movement of said cartridge toward said longitudinal ends of said body shells upon compression of said spring to release said cartridge base indexing notches from engagement with said body shell indexing notch engaging ribs to permit rotation of said tool cartridge relative to said engaging ribs and upon expansion of said spring to return said base of said cartridge into engagement with said base support ribs and said indexing notch engaging ribs when said tool cartridge has been rotatably indexed relative to said tool handle.

9. A hand held impact tool for seating and cutting in a communications wire in a terminal block, said impact tool including:

a handle formed of a pair of body shells which are joined longitudinally to each other to form an opening between them at one longitudinal end of said handle, a tool cartridge supported in said handle and extending outwardly through said opening formed by said pair of body shells, a hammer pivotally mounted in said handle for rotational movement toward and away from at least one of said body shells and biased against said at least one of said body shells, a wire seating blade mounted in said cartridge for longitudinal movement relative thereto, a plunger mounted in said tool cartridge and extending into said handle to contact said hammer in an off-center relationship, said plunger mounted to move longitudinally against said hammer upon longitudinal movement of said wire seating blade into said handle to rotate said hammer away from said at least one of said body shells and against said biasing means, said plunger being further mounted so that continued longitudinal movement of said plunger against said hammer disengages said plunger and hammer allowing said biasing means to move said hammer into engagement with said at least one of said body shells.

10. A hand held impact tool for seating and cutting a communications wire in a terminal block, said impact tool including:

a handle formed of a pair of body shells which are joined longitudinally to each other to form an opening between them at one longitudinal end of said handle, a tool cartridge supported in said handle and extending outwardly through said opening formed by said pair of body shells, a tool storage compartment formed in one of said body shells, a door for said compartment mounted on one of said body shells for rotation towards and away from said body shell to open and close said tool storage compartment.

* * * * *